United States Patent
Ritter et al.

(10) Patent No.: US 12,192,286 B2
(45) Date of Patent: Jan. 7, 2025

(54) SYSTEMS AND METHODS FOR REMOTE INDUSTRIAL MACHINE COMMUNCIATION SYSTEM DIAGNOSTICS AND SOLUTIONS

(71) Applicant: DEERE & COMPANY, Moline, IL (US)

(72) Inventors: Curtis P. Ritter, Waterloo, IA (US); Joseph A. Bell, Marion, IN (US); Michael F. Flanagan, Bettendorf, IA (US); Daniel Luan Rossi, Santa Rosa (BR); Donald J. Adams, Asbury, IA (US); Matheus Felipe Bedendo Hickmann, Tres de Maio (BR)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/448,683

(22) Filed: Aug. 11, 2023

(65) Prior Publication Data
US 2024/0073282 A1 Feb. 29, 2024

Related U.S. Application Data

(60) Provisional application No. 63/373,396, filed on Aug. 24, 2022.

(51) Int. Cl.
*H04L 67/12* (2022.01)
(52) U.S. Cl.
CPC .................................. *H04L 67/12* (2013.01)
(58) Field of Classification Search
CPC ...... H04L 67/12; H04L 41/0631; G06F 11/07; G06F 11/0703; G06F 11/0706;
(Continued)

(56) References Cited

U.S. PATENT DOCUMENTS 6,330,499 B1   12/2001   Chou et al.
7,398,428 B2   7/2008   Hille
(Continued)

OTHER PUBLICATIONS

European Search Report issued in counterpart application No. 20186767.8 dated Nov. 25, 2020 (09 pages).
(Continued)

*Primary Examiner* — David R Lazaro
(74) *Attorney, Agent, or Firm* — Michael Best & Friedrich LLP

(57) ABSTRACT

Systems and methods of diagnosing a communication system within an industrial machine. The method includes receiving, from the industrial machine, communication system data of the communication system of the industrial machine and determining whether the received communication system data indicates an occurrence of a communication system issue. The method further includes determining whether the received communication system data includes one or more dismissive parameters in response to determining that the received communication system data indicates the occurrence of the communication system issue. The method also includes analyzing the received communication system data to determine whether a remote resolution to the communication system issue is available and transmitting the remote resolution to a user associated with the industrial machine in response to determining that the remote resolution to the communication system issue is available.

20 Claims, 8 Drawing Sheets

(58) Field of Classification Search
CPC ............ G06F 11/0709; G06F 11/0766; G06F 11/0775; G06F 11/079; G06F 11/0793
See application file for complete search history.

(56) References Cited

U.S. PATENT DOCUMENTS

| | | | |
|---|---|---|---|
| 7,631,064 | B1 | 12/2009 | Gray |
| 8,699,356 | B2 | 4/2014 | Smart et al. |
| 9,563,492 | B2 | 2/2017 | Bell et al. |
| 9,765,690 | B2 | 9/2017 | Ritter et al. |
| 10,657,450 | B2 | 5/2020 | Ritter et al. |
| 11,233,713 | B2 * | 1/2022 | Brinkman ............ G07C 5/0808 |
| 11,693,924 | B2 * | 7/2023 | Khorasgani ......... G06F 18/2323 |
| | | | 700/110 |
| 2008/0186870 | A1 * | 8/2008 | Butts ................... H04L 43/0847 |
| | | | 370/252 |
| 2010/0082805 | A1 | 4/2010 | Orton et al. |
| 2012/0041635 | A1 * | 2/2012 | Johnson .............. G06F 11/2294 |
| | | | 701/31.4 |
| 2015/0347258 | A1 * | 12/2015 | Du ....................... G06F 11/3062 |
| | | | 714/4.2 |
| 2016/0163125 | A1 | 6/2016 | Kim |
| 2018/0060159 | A1 * | 3/2018 | Justin .................. G06F 11/0751 |
| 2019/0120159 | A1 | 4/2019 | Brinkman et al. |
| 2019/0312892 | A1 | 10/2019 | Chung et al. |
| 2020/0051347 | A1 | 2/2020 | Bohl et al. |
| 2021/0021497 | A1 * | 1/2021 | Brinkman ............... H04L 12/40 |
| 2022/0224101 | A1 * | 7/2022 | Jhaveri .................. G01R 31/50 |
| 2023/0231784 | A1 * | 7/2023 | Ritter .................... H04W 24/08 |
| | | | 709/224 |
| 2023/0350398 | A1 * | 11/2023 | Hita ..................... G05B 23/0216 |
| 2024/0038058 | A1 * | 2/2024 | Sadu ...................... B60Q 9/008 |
| 2024/0073282 | A1 * | 2/2024 | Ritter ..................... H04L 67/12 |
| 2024/0219879 | A1 * | 7/2024 | Falk ................... G05B 19/0428 |

OTHER PUBLICATIONS

Extended European Search Report and Written Opinion issued in European Patent Application No. 22197973.5, dated Jun. 1, 2023, in 09 pages.

* cited by examiner

SYSTEMS AND METHODS FOR REMOTE INDUSTRIAL MACHINE COMMUNCIATION SYSTEM DIAGNOSTICS AND SOLUTIONS

FIELD

Various herein described embodiments relate to remote diagnostics to determine the health of communication system components of industrial machines.

BACKGROUND

Modern industrial machines, which can include industrial vehicles (e.g., agricultural, construction, forestry, mining vehicles, etc.) and stationary industrial equipment (e.g., generators, pumps, compressors, etc.) are complex systems that can include numerous controllers, such as Electronic Control Modules (ECMs) and/or units (ECUs). The controllers are generally networked using one or more communication systems. Example communication systems may include Controller Area Networks (CAN), Local Interconnect Networks (LIN), Ethernet Networks, etc. Due to the quantity of controllers and complexity of the associated communication networks within modern industrial devices, diagnosing issues within the communication systems has become more difficult. Certain industrial machines are equipped with internal diagnostic systems. However, these internal systems may be limited in scope due to size, cost, or performance considerations. Technicians and service centers are often equipped with significantly more robust and sophisticated diagnostic capabilities for analyzing industrial machine systems but not necessarily for CAN and connectivity issues. Further, this may require an operator to transport the industrial vehicle to a service center or schedule a technician to travel to the site of the industrial vehicle, potentially resulting in unnecessary cost and downtime.

As noted above, the complexity of the systems can result in a technician being required to travel to the location of the machine and spending a significant amount of time trying to establish or diagnose communication issues instead of addressing the customer's complaint. The technician may have various tools at their disposal when diagnosing issues on-site. Examples of technician implemented communication network diagnostic tools are found in U.S. Pat. No. 11,233,713, entitled Controller Area Network and Connectivity Health Troubleshooting System, the contents of which are incorporated by reference herein. However, this still requires a user to schedule a time with the technician to travel to the industrial device (or transport the industrial device to the technician) which may result in additional downtime and/or cost, such as due to transportation. For example, upon a technician diagnosing one or more issues, the technician may then be required to schedule a separate time to correct the issue where the issue is not immediately correctable upon diagnosis.

Accordingly, there is a need to be able to perform at least some diagnostics related to industrial device communication networks remotely to reduce downtime and allow for communication network issues to be diagnosed and/or resolved remotely.

SUMMARY

In one embodiment, a method of diagnosing a communication system within an industrial machine is described. The method includes receiving, from the industrial machine, communication system data of the communication system of the industrial machine and determining whether the received communication system data indicates an occurrence of a communication system issue. The method further includes determining whether the received communication system data includes one or more dismissive parameters in response to determining that the received communication system data indicates the occurrence of the communication system issue. The method also includes analyzing the received communication system data to determine whether a remote resolution to the communication system issue is available and transmitting the remote resolution to a user associated with the industrial machine in response to determining that the remote resolution to the communication system issue is available.

In another embodiment, a system for diagnosing a communication system within an industrial machine is disclosed. The system includes a service system in communication with a telematics unit of an industrial machine via a communication protocol. The service system includes an electronic processor configured to receive, from the industrial machine, communication system data associated within the communication system and determine whether the received communication system data indicates an occurrence of a communication system issue. The electronic processor is also configured to determine whether the received communication system data includes one or more dismissive parameters in response to determining that the received communication system data indicates the occurrence of the communication system issue. The electronic processor is also configured to determine whether the received communication system data includes one or more dismissive parameters in response to determining that the received communication system data indicates the occurrence of the communication system and analyze the received communication system data to determine whether a remote resolution to the communication system issue is available. The electronic processor is configured to transmit the remote resolution to a user associated with the industrial machine in response to determining that the remote resolution to the communication issue is available.

According to another exemplary embodiment, an industrial machine connection and communication diagnostic system includes a communication interface and a diagnostic module. The communication interface is configured to connect to an electronic processing system of an industrial machine. The electronic processing system includes a CAN bus and a plurality of controllers connected to the CAN bus, the plurality of controllers programmed to run one or more software applications. The diagnostic module is configured to initiate a controller response check. The controller response check includes determining the number of controllers and the controller layout, request a response from each controller, provide a graphical representation of the controller layout, determine a fault, and display the location of the fault on the graphical representation.

Another embodiment includes a method of diagnosing a communication system within an industrial machine. The method includes receiving, from the industrial machine, communication system data of the communication system of the industrial machine and determining whether the received communication system data includes one or more dismissive parameters in response to determining that the received communication system data indicates the occurrence of the communication system issue. The method also includes analyzing the received communication system data to determine whether a remote resolution to the communication system issue is available and transmitting a request to the industrial machine to provide additional information in response to determining that the remote resolution is not available. The method also includes transmitting the remote resolution to a user associated with the industrial machine in response to determining that the remote resolution to the communication system issue is available.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

Industrial machines have become more electrified and complex over time. Oftentimes, these industrial machines may include multiple controllers and include advanced communication networks using one or more communication protocols. While these advanced communication networks have allowed for more efficient and advanced industrial machines, they have also resulted in maintenance and troubleshooting of issues more complicated. The embodiments described herein provide systems and solutions to improve both maintenance and troubleshooting of issues within communication networks in industrial machines.

Figure 1:
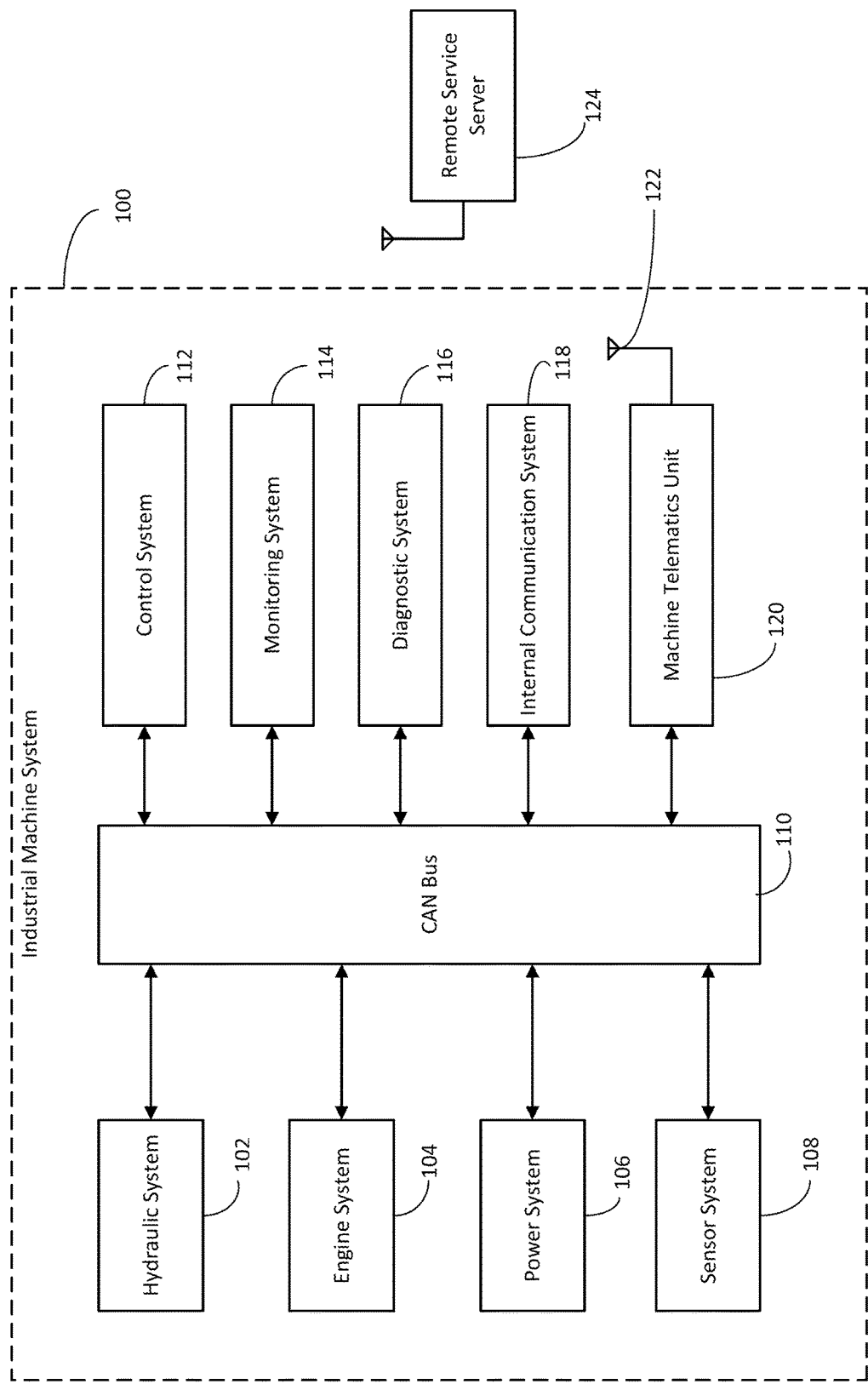
FIG. 1 is a block diagram of an industrial machine system according to some embodiments.

FIG. 1 is a block diagram of an industrial machine system 100. Industrial machines, as described herein, may include various types of industrial machines. For example, industrial machines include mobile machines such as agricultural machines (e.g., combines, tractors, planters, sprayer, balers, and/or other applicable agricultural machines), construction machines (e.g., excavators, backhoes, bulldozers, graders, loaders, trenchers, dump trucks, and/or other applicable construction machines), and consumer grade machinery, as well as stationary equipment such as power generators.

The industrial machine system 100 may include the different hardware and software components utilized in the operation of the industrial machine. In some embodiments, the industrial machine system 100 is connected to multiple sub-systems within the industrial machine. These sub-systems may include hydraulic system 102, an engine system 104, a power system (e.g., generator, batteries, prime mover, etc.) 106 and/or a sensor system 108. Other systems and/or components may include transmission systems, HVAC systems, tool and/or work implement systems, or other applicable systems or components may also be coupled to the industrial machine system 100.

In some examples, the hydraulic system 102 may include multiple pumps, valves, and other control mechanisms required to operate one or more systems of the industrial machine, such as tools or other attachments, boom control, and/or any other hydraulic component associated with the industrial machines. The engine system 104 may include an engine, such as an internal combustion engine (e.g., gasoline, diesel, etc.) used to provide power to one or more systems of the industrial machine, such as the power system and/or the hydraulic system. In some examples, the engine may provide power to one or more ground engaging members, such as tires or treads, to allow for movement of the industrial machine.

The power system 106 may be configured to provide power to one or more of systems of the industrial machine. For example, the power system 106 may include a prime mover (e.g., drive shaft, power take off, electric motors, etc.) or energy storage devices such as batteries, super capacitors, or other energy storage devices as required for a given application. In some examples, the power system 106 may include one or more devices coupled to the engine system 104. For example, the power system 106 may include a generator that is driven by the engine system 104. The generator may be an AC generator or a DC generator. For example, the generator may provide DC power to one or more batteries within the power system 106. The electrical power generated by the generator may be used to supply power to one or more components and/or systems of the industrial machine.

The sensor system 108 may include various sensors associated with the industrial machine. Example sensors may include engine sensors (e.g., temperature, pressure, RPM, fuel level, or other engine sensors as required for a given application), electrical sensors (voltage, current, power, temperature, and/or other electrical sensors as required for a given application), vehicle sensors (speed sensors, temperature, humidity, hydraulic, and/or other vehicle sensors as required for a given application), and/or other sensors required in the operation of the industrial machine.

The one or more systems may communicate with each other, and/or other systems via a communication network such as a Controller Area Network ("CAN"). As shown in FIG. 1 the hydraulic system 102, the engine system 104, the power system 106 and the sensors system 108 all interface with a CAN bus 110. The CAN bus 110 may bus may be an ISO 11898-2, an ISO 11898-3, or other CAN bus type as required for a given application. While the communication bus is shown as CAN bus 110 in FIG. 1, it is understood that other communication bus types, such as Ethernet, Automotive Ethernet, Media Oriented System Transport ("MOST), Flex Ray, and/or other communication types for a given application may also be used.

The CAN bus 110 may be include one or more CAN-based controllers associated therewith. In one embodiment, the various systems described above may have one or more CAN controllers for communication over the CAN bus 110.

Various electrical and/or control systems may be coupled to the CAN bus 110, as shown in FIG. 1. These electrical systems can include a control system 112, a monitoring system 114, a diagnostic system 116, an internal communication system 118, and a machine telematics unit ("MTU")

120. These systems may perform various operations and functions associated with a given industrial machine, as described below. For example, the control system 112 may be configured to control the operation of one or more of the industrial machine systems described above. For example, the control system 112 may include various controllers for operating the industrial machine systems, such as the hydraulic system 102, the engine system 104, the power system 106, and/or the sensor system 108. In some examples, the control system 112 includes multiple controllers for each of the one or more machine systems described above. In one example, the control system 112 may include a master controller for coordinating operations between the multiple system controllers within the control system 112.

The monitoring system 114 may include one or more controllers and/or other devices for monitoring various aspects of the industrial machine. For example, the monitoring system 114 may interface with the sensors system 108 for monitoring parameters associated with various systems, such as the hydraulic system 102, the engine system 104, the power system 106, and/or any other system within the industrial machine. The monitoring system 114 may monitor various sensed parameters and generate one or more outputs based on the monitored parameters. For example, the monitoring system 114 may interface with one or more user interfaces, such as gauges, displays, touchscreen interfaces, or the like to allow a user or operator to observe the monitored parameters of the industrial machine.

The diagnostic system 116 may include various controllers configured to perform diagnostics on one or more systems of the industrial machine, such as the hydraulic system 102, the engine system 104, the power system 106, the CAN bus 110, the control system 112, one or more internal communication system 118, etc. In one example, the diagnostic system 116 may receive information from the monitoring system 114 and subsequently perform diagnostic operations to evaluate the health and/or operational ability of the various systems of the industrial machine. In other examples, the diagnostic system 116 may further receive data from the one or more sensors of the sensor system 108, and subsequently process the data using the one or more controllers associated with the diagnostic system 116. The diagnostic system 116 may further receive data from the CAN bus 110 related to CAN communications within the industrial machine. CAN bus data may include bus traffic, bus speed, packet loss, latency, etc. Other data, such as received from the control system 112, the internal communication system 118 and/or the MTU may further be used by the diagnostic system 116.

In some examples, the diagnostic system 116 may generate an output to one or more other systems of the industrial machine. For example, the diagnostic system 116 may generate diagnostic trouble codes ("DTC") and/or process received DTCs from various system controllers. The diagnostic system 116 may further determine various other diagnostic issues (e.g., faults, critical faults, communication issues, predictive maintenance data, etc.) based on data received as described above. In some embodiments, the output of the diagnostic system 116 is provided to the monitoring system 114 which may output the diagnostic data via the user interface as described above. In other embodiments, the diagnostics system 116 may be able to communicate with one or more user interfaces directly. In still further embodiments, the diagnostic system 116 may output diagnostic data to the MTU 120, which may further transmit the diagnostic data to a remote device, such as remote service server 124. In some examples, a user, such as a technician, may be able to access the diagnostic system 116 via a diagnostic tool, which may be coupled to the diagnostic system, such as via the CAN bus 110 and/or a direct connection to the diagnostic system 116, such as via an on-board diagnostics ("OBD") port.

The internal communication system 118 may include various controllers for providing communication within the industrial machine. For example, the internal communication system 118 may include one or more CAN controllers for controlling the CAN bus 110. The internal communication system may further include controllers associated with other internal communication systems, such as Ethernet controllers, Bluetooth controllers, Wi-Fi controllers, and/or any other applicable internal communication controllers and/or devices. While CAN communication is generally recited herein for consistency, CAN is understood to be used only an example, and the systems and methods described herein can readily apply to CAN, Wired Ethernet, Local Interconnect Network ("LIN"), Wi-Fi, and other technologies as required for a given application. Additionally, some examples described herein refer to capabilities of the SAE J1939 and ISO 11783 CAN-based communications protocols, but the methods are applicable to other protocols in addition to other physical layers (CAN v. Ethernet).

The MTU 120 may be configured to communicate with one or more external devices, such as the remote service server 124. In one embodiment, the MTU 120 is configured to transmit data associated with the industrial machine to the external devices. For example, the MTU 120 may receive data from one or more of the other systems within the industrial machine, such as the control system 112, the monitoring system 114, the diagnostic system 116, and/or the internal communication system 118. The MTU 120 may further be configured to receive data via a wireless connection, such as via antenna 122. For example, the MTU 120 may receive global positioning data from global positioning satellites (e.g., GPS, GLONASS, Galileo, BeiDou, etc.). In other examples, the MTU 120 may receive data from, as well as transmit data to, external devices, such as the remote service server 124, as will be described in more detail below. In one embodiment, the MTU 120 is configured to facilitate communication between the industrial vehicle and one or more external devices.

Figure 2:
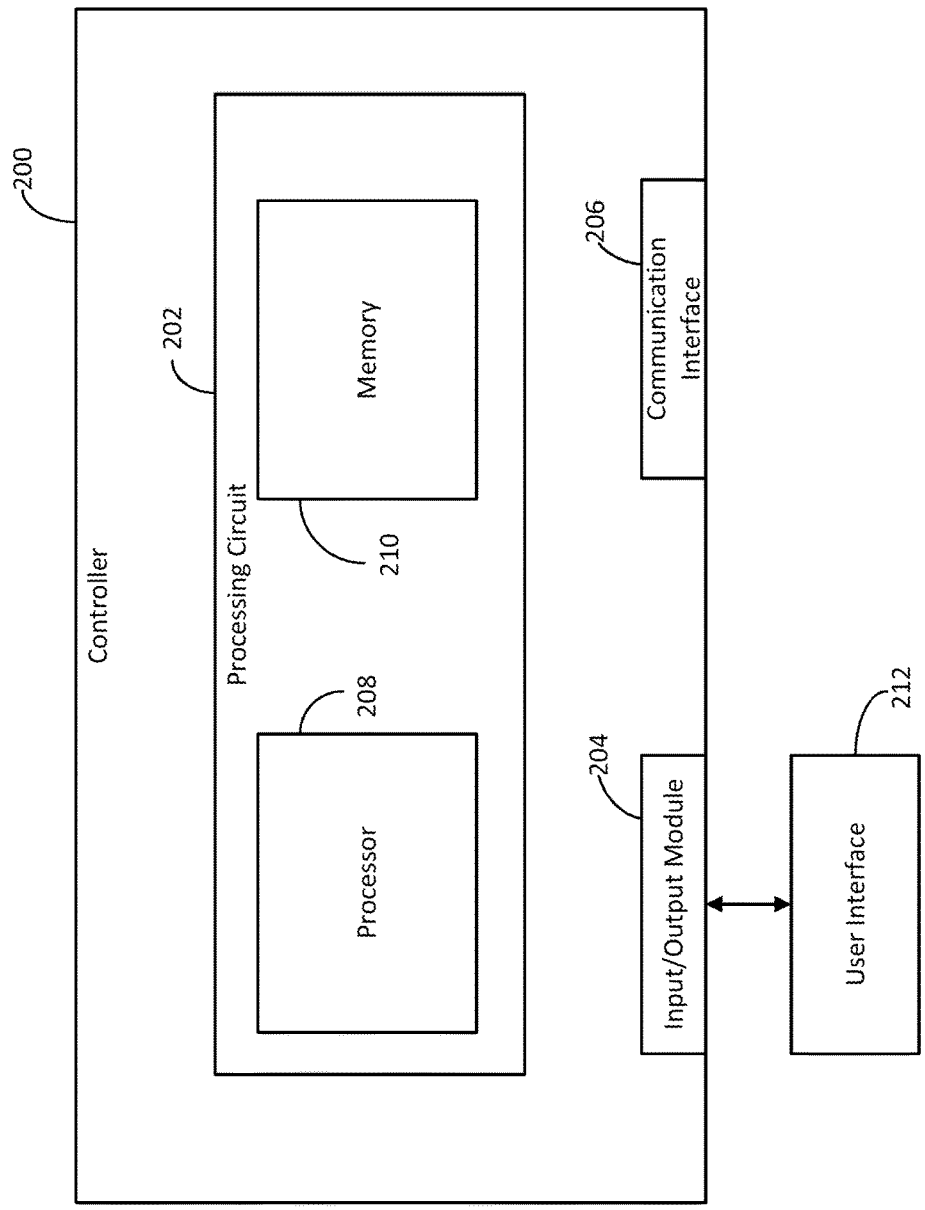
FIG. 2 is a block diagram of a controller of the industrial machine system of FIG. 1, according to some embodiments.

Turning now to FIG. 2, a block diagram illustrating a controller 200 of the industrial system is shown, according to some embodiments. The controller 200 is representative of controllers associated with the various systems described above, such as the control system 112, the monitoring system 114, the diagnostic system 116, and/or the internal communication system 118. Each above noted system may utilize one or more controllers, such as controller 200. In some embodiments, multiple systems may be integrated into one or more controllers, such as controller 200.

The controller 200 may include a processing circuit 202, an input/output ("I/O") module 204, and a communication interface 206. The processing circuit 202 may include one or more electronic processors 208 and one or more memory devices 210. The processing circuit 202 may be in electronic communication with the I/O module and/or the communication interface 206. The electronic processor 208 may be implemented as a programmable microprocessor, an application specific integrated circuit ("ASIC"), one or more field programmable gate arrays ("FPGA"), a group of processing components, or using other suitable electronic processing components.

The memory devices 210 (for example, non-transitory, computer readable mediums) may include one or more devices (for example, RAM, ROM, flash memory, hard disk storage, etc.) for storing data and/or computer code for completing or facilitating some or all of the various processes described herein. The memory devices 210 may include database components, object code components, script components, and/or other types of code and information for supporting the various activities and information structure described in the present application. In some examples, the memory devices 210 are communicably connected to the electronic processor 208 via the processing circuit 202 and may include computer code for executing (for example, by the processing circuit 202 and/or the electronic processor 208) one or more processing described herein.

The I/O module may be coupled to one or more components or systems within the industrial machine system 100, such as the hydraulic system 102, the engine system 104, the power system 106, and/or the sensor system 108. For example, the sensors of the sensor system 108 may be coupled directly to the I/O module 204. In some aspects, the I/O module may be coupled to a user interface 212. The user interface 212 may be configured to allow for one or more inputs to be provided to the associated controller 200. The user interface 212 may be a touchscreen interface, a display, a keyboard, a control panel having one or more displays and other user inputs (soft keys, hard keys, etc.), or any other device configured to allow for a user to receive and/or provide data to the controller 200.

The communication interface 206 is configured to allow for communication between one or more controllers 200 and or other devices, such as via the CAN bus 110. For example, the communication interface 206 may be configured to provide communication between components within the industrial machine system 100, using various communication protocols, such as CAN communication protocols, Ethernet communication protocols, LIN communication protocols, and/or other communication protocols as required for a given application.

Figure 3:
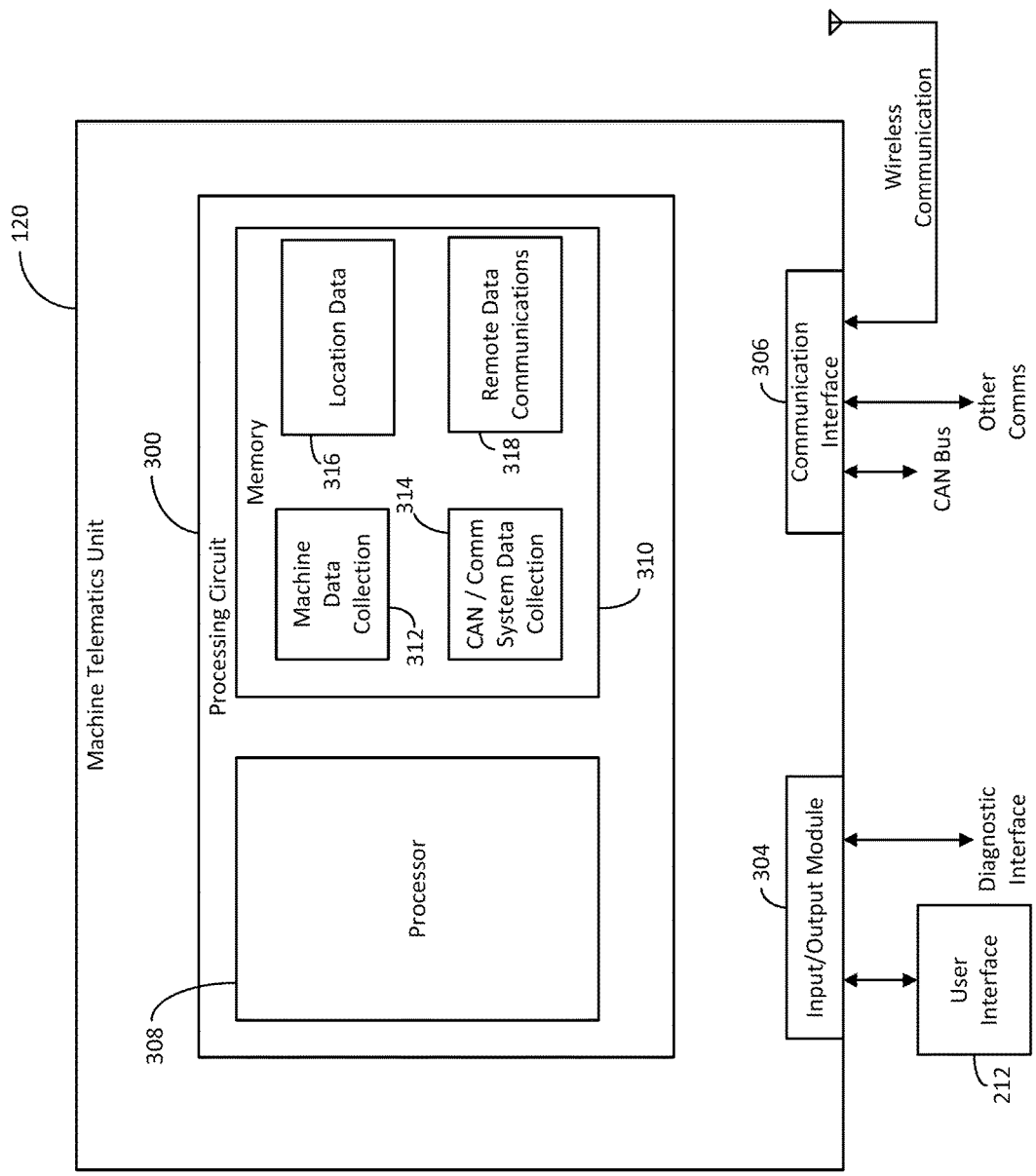
FIG. 3 is a block diagram of a machine telematic unit controller of the industrial machine system of FIG. 1, according to some embodiments.

Turning now to FIG. 3, a block diagram of the MTU 120 is shown, according to some details. In some examples, the MTU 120 is similar to the controller 200 described above. The MTU 120 may include a processing circuit 300, an input/output ("I/O") module 304, and a communication interface 306. The processing circuit 300 may include one or more electronic processors 308 and one or more memory devices 310. The processing circuit 300 may be in electronic communication with the I/O module 304 and/or the communication interface 306. The electronic processor 308 may be implemented as a programmable microprocessor, an application specific integrated circuit ("ASIC"), one or more field programmable gate arrays ("FPGA"), a group of processing components, or using other suitable electronic processing components.

The memory devices 310 (for example, non-transitory, computer readable mediums) may include one or more devices (for example, RAM, ROM, flash memory, hard disk storage, etc.) for storing data and/or computer code for completing or facilitating some or all of the various processes described herein. The memory devices 310 may include database components, object code components, script components, and/or other types of code and information for supporting the various activities and information structure described in the present application. In some examples, the memory devices 310 are communicably connected to the electronic processor 308 via the processing circuit 300 and may include computer code for executing (for example, by the processing circuit 300 and/or the electronic processor 308) one or more processing described herein.

The I/O module 304 may be coupled to one or more components or systems within the industrial machine system 100, such as the hydraulic system 102, the engine system 104, the power system 106, and/or the sensor system 108. For example, the sensors of the sensor system 108 may be coupled directly to the I/O module 304. In some aspects, the I/O module may be coupled to a user interface, such as user interface 212 described above. The user interface 212 may be configured to allow for one more inputs to be provided to the MTU 120.

The communication interface 306 is configured to allow for communication between MTU 120 and other devices, such as via the CAN bus 110. For example, the communication interface 206 may be configured to provide communication between components within the industrial machine system 100, using various communication protocols, such as CAN communication protocols, Ethernet communication protocols, LIN communication protocols, and/or other communication protocols as required for a given application. The communication interface 306 may further be configured to receive positional data, such as via global positioning satellites, as described above.

The communication interface 306 may further be configured to communicate via wireless communication protocols via one or more antennas, such as antenna 122. For example, the communication interface 306 may communicate using one or more wireless protocols, such as RF, Bluetooth, cellular (e.g., 3G, 4G, 5G, CDMA, etc.), RF, Wi-Fi, NFC, LoRA, and the like. The communication interface 306 may further allow for various wired communications, such as ODB II, USB, USB-C, RS-232 (or other serial communication), Firewire, Ethernet, or other wired communication as required for a given application.

The memory devices 310, as noted above, may include one or more software modules, such as a machine data collection module 312, a CAN/Communication system data collection module 314, a location data module 316, and/or a remote data communications module 318.

The machine data collection module 312 may be configured to process data associated with the industrial machine system, such as data collected and/or generated by the control system 112, the monitoring system 114, the diagnostic system 116, and/or the internal communication system 118. The machine data collection module 312 may, in some examples, collect data directly from various systems within the industrial machine system 100, such as the hydraulic system 102, the engine system 104, the power system 106, etc. Data collection functions performed by the machine data collection module 312 will be described in more detail below.

The CAN/communication system data collection module 314 may be configured to receive and process various data associated with one or more communication systems of the industrial machine system. For example, the CAN/communication system data collection module 314 may receive data directly from the CAN bus 110, or via the internal communication system 118. In some examples, CAN/communication system data collection module 314 may be configured to analyze data associated with the various communication systems, including the CAN bus 110 and determine various characteristics, such as system health, faults, or other issues. The CAN/communication system data collection module 314 functions will be described in more detail below.

The location data module 316 may be configured to process location data, such as data received from global positioning satellites. In some examples, the location data module 316 may determine a location of the industrial machine associated with the industrial machine system 100 and package the location data into a message for communication over the communication interface 306.

The remote data communications module 318 may be configured to generate data packets for communication over the communication interface 306 to other devices, such as the remote service server 124, described above. For example, the remote data communications module 318 may process data received from other modules, such as the machine data collection module 312, the CAN/communication system data collection module 314, and/or the location data module 316 for transmission via the communication interface 306. The remote data communications module 318 may process the data by converting the data into data packets suitable for transmission via one or more communication protocols. The remote data communications module 318 may also be configured to unpack data received via the communication interface 306 for processing by the MTU 120, and/or other various components or systems of the industrial machine system and transmit the unpacked data to the other components/systems via the I/O module 304 and/or the communication interface 306.

Figure 4:
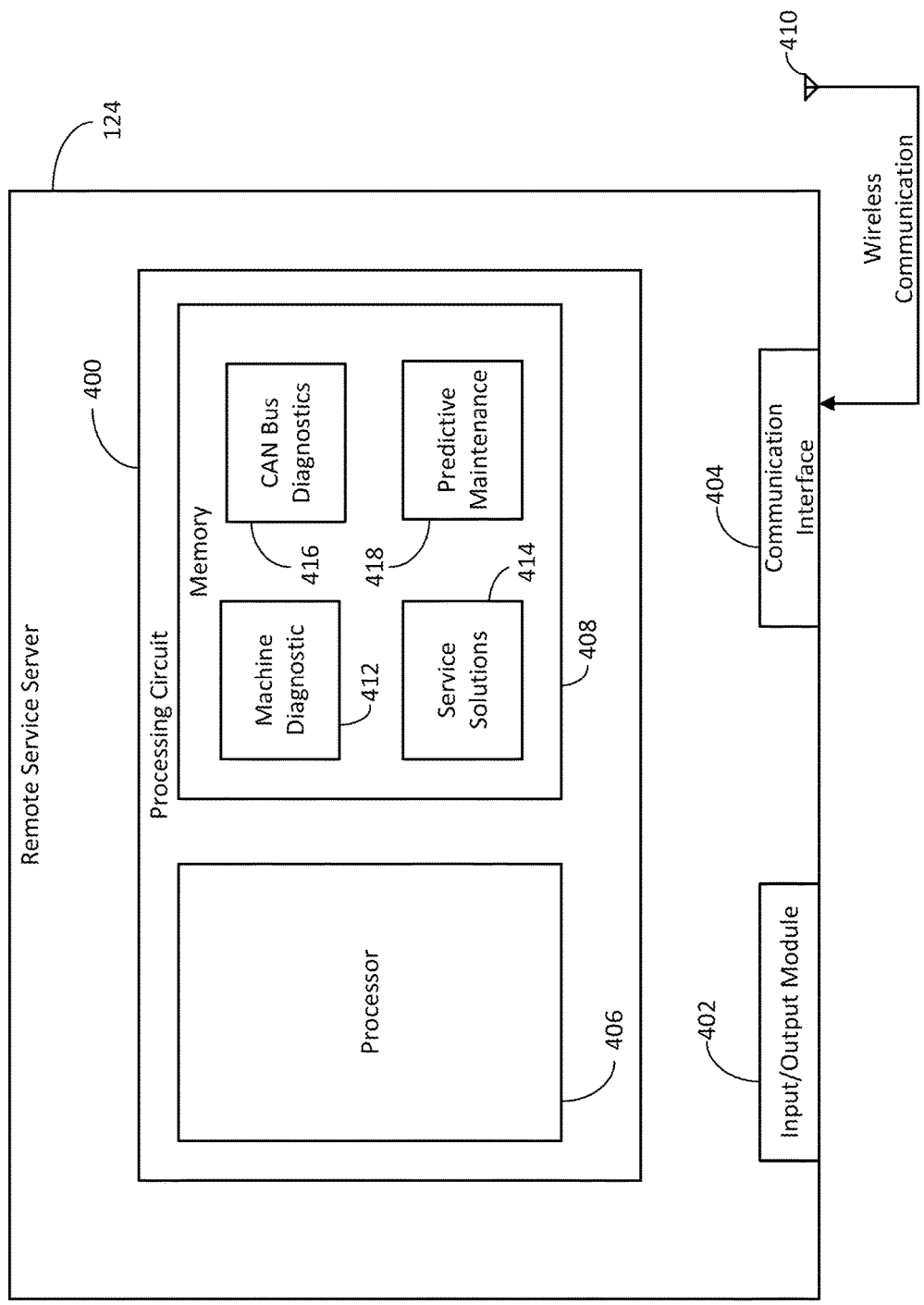
FIG. 4 is a block diagram of a remote service server, according to some embodiments.

Turning now to FIG. 4, a block diagram of a remote service server, such as remote service server 124 described above, is shown, according to some details. The remote service server 124 may be configured to communicate with one or more industrial machines, such as those described above. The remote service server 124 may be a hardware server (e.g., on-prem) or cloud-based. In some examples, the remote service server 124 is associated with a manufacturer of the industrial machines. For example, the remote service server 124 may be associated with a service center or technical support department of the manufacturer. In other examples, the remote service server 124 may be associated with a dealership or service center.

The remote service server 124 is configured to receive data, such as maintenance, diagnostic, and/or fault data from one or more industrial machines and process said data. For example, the remote service server 124 may process the data to provide service solutions, determine diagnostic issues, predict maintenance, and/or provide other analysis and processes as required for a given application. While the remote service server 124 is described as a single device with respect to FIG. 4, it is understood that the remote service server 124 may be a collection of devices, processors, servers, databases, and the like that can operate to perform the functions described herein.

The remote service server 124 may include a processing circuit 400, an input/output ("I/O") module 402, and a communication interface 404. The processing circuit 400 may include one or more electronic processors 406 and one or more memory devices 408. The processing circuit 400 may be in electronic communication with the I/O module 402 and/or the communication interface 404. The electronic processor 406 may be implemented as a programmable microprocessor, an application specific integrated circuit ("ASIC"), one or more field programmable gate arrays ("FPGA"), a group of processing components, or using other suitable electronic processing components.

The memory devices 408 (for example, non-transitory, computer readable mediums) may include one or more devices (for example, RAM, ROM, flash memory, hard disk storage, etc.) for storing data and/or computer code for completing or facilitating some or all of the various processes described herein. The memory devices 408 may include database components, object code components, script components, and/or other types of code and information for supporting the various activities and information structure described in the present application. In some examples, the memory devices 408 are communicably connected to the electronic processor 406 via the processing circuit 400 and may include computer code for executing (for example, by the processing circuit 400 and/or the electronic processor 406) one or more processing described herein.

The I/O module 402 may be coupled to one or more components or devices associated with the remote service server 124, such as a user terminal, displays, input devices, and/or any other external device required for a given application.

The communication interface 404 is configured to allow for communication between the remote service server 124 and other devices, such as one or more industrial vehicles and/or industrial machine system 100. For example, the communication interface 404 may be configured to provide communication between the remote service server 124 and industrial vehicle systems such as industrial machine system 100, using various communication protocols. For example, the communication interface 404 may be configured to communicate with the industrial machine system 100 using a wired communication protocol, such as an Ethernet communication protocol, a fiber optic protocol, and/or other wired communication protocols as required for a given application.

The communication interface 404 may further be configured to communicate via wireless communication protocols using one or more antennas, such as antenna 410. For example, the communication interface 404 may communicate using one or more wireless protocols, such as RF, Bluetooth, cellular (e.g., 3G, 4G, 5G, CDMA, etc.), RF, Wi-Fi, NFC, LoRA, and/or other wireless protocol as required for a given application.

The memory devices 408, as noted above, may include one or more software modules, such as a machine diagnostic module 412, a service solutions module 414, a communication bus diagnostics module 416, and/or a predictive maintenance module 418. The machine diagnostic module 412 may be configured to perform diagnostic operations on data received from the industrial machine system 100. Example diagnostic operations may include analysis of fault codes, DTCs, corresponding user input, and/or other relevant data to diagnose one or more issues associated with the industrial machine system 100.

The service solutions module 414 may be configured to generate one or more solutions associated with a diagnosed issue associated with the industrial machine system 100. In one embodiment, the service solutions module 414 may receive data from one or more other software modules such as the machine diagnostic module 412, the communication bus diagnostics module 416, and/or the predictive maintenance module 418. In some embodiments, the service solutions module 414 may be configured to generate one or more alerts or messages upon determining a service solution. For example, an alert, such as Expert Alerts, part of John Deere Connected Support® may be provided to a technician, user, or other appropriate personnel upon one or more solutions to an issue being determined. The alerts may include instructions for resolving an issue, recommendations for solving an issue, requests for more information, instructions to open a maintenance ticket (e.g., dispatch technical personnel or request to user to bring industrial machine in for service), automated dispatch of technical personnel, etc.

Example generated solutions are described in detail in U.S. Pat. No. 11,233,713 entitled Controller Area Network and Connectivity Health Troubleshooting System, U.S. Pat. No. 10,657,450 entitled machine diagnostic systems and U.S. Pat. No. 9,765,690 entitled Variable Geometry Turbocharger Prognostics, which are hereby incorporated by references in their entireties herein.

The communication bus diagnostics module 416 may be configured to analyze data associated with a communication bus or system of an industrial machine, such as CAN bus 110, described above. Information related to a communication bus of an industrial machine, such as individual DTCs, combinations of DTCs, CAN bus statistics (e.g., bus errors, bus voltages, message counts, bus traffic, latency, etc., is analyzed to determine various parameters of the industrial vehicle communication bus/systems. These parameters may include network health, fault determination, improper connections, controller issues, grounding issues, programming issues, etc. Communication bus diagnostics performed by the communication bus diagnostics module 416 are described in more detail below.

The predictive maintenance module 418 may be configured to process data received from an industrial machine to predict potential issues, faults, failures, etc. associated with the industrial vehicle. The predictive maintenance module 418 may utilize real-time data, historical data, and/or a combination thereof to predict further behaviors of the industrial machine. In some examples, the predictive maintenance module 418 may utilize various processes or programs to predict behaviors, such as Machine Learning processing. Machine Learning processes may utilize one or more of decision tree learning, associates rule learning, artificial neural networks, recurrent artificial neural networks, long short term memory neural networks, inductive logic programming, support vector machines, clustering, Bayesian networks, reinforcement learning, representation learning, similarity and metric learning, sparse dictionary learning, genetic algorithms, k-nearest neighbor (KNN), and/or other processes as required for a given application. Additional details regarding operations and functions of the predictive maintenance module 418 will be described in more detail below.

Figure 5:
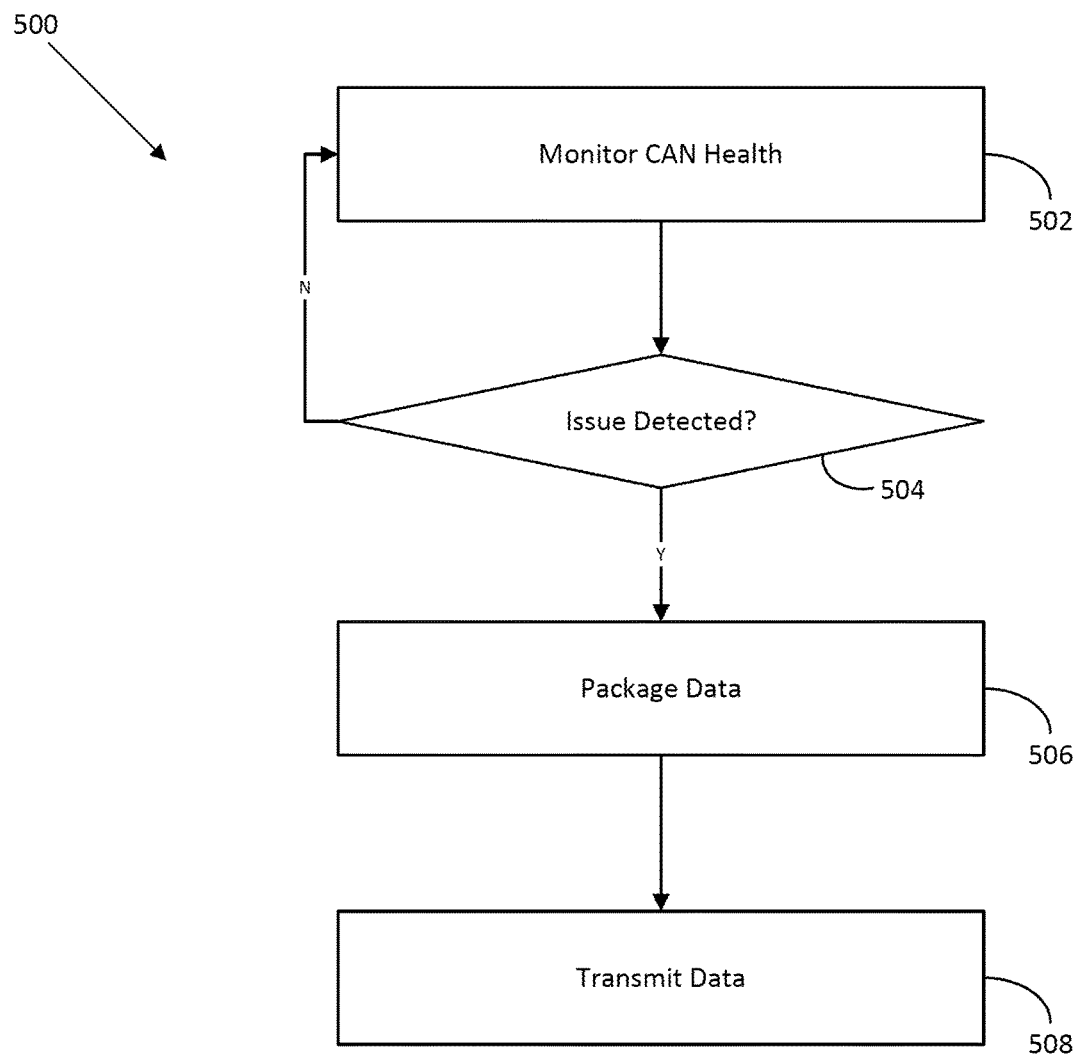
FIG. 5 is a flow chart illustrating a process for monitoring the health of a communication network of an industrial machine, according to some embodiments.

Turning now to FIG. 5, a process 500 for monitoring the health of a communication network, such as CAN bus 110 of an industrial machine is shown, according to some embodiments. The process 500 may be performed by the MTU 120. In some embodiments, the MTU 120 may perform the process 500 based on data received from one or more other systems of the industrial machine system 100, such as the internal communication system 118, the diagnostic system 116, and/or the monitoring system 114. In one embodiment, the process 500 is executed by the processing circuit 300 of the MTU 120, such as via the processor 308 and memory devices 310. While various systems within the industrial machine system may perform the functions of the process 500, the process will be described as being performed by the MTU 120 for brevity.

At process block 502, the communication network health is monitored. For example, the internal communication system 118 and/or the diagnostic system 116 may monitor the communication network health. Monitoring the communication network health may include monitoring one or more parameters of the communication system, such as generated DTCs, error frames, bus traffic, bus statistics, lost connections, etc. In some embodiments, the MTU 120 may receive data at 1 Hz intervals. However, interval frequencies of more than 1 Hz or less than 1 Hz are also contemplated.

At process block 504, the MTU 120 determines whether an issue with the communication system has been detected. Issues may be the result of various conditions, such as bus overloading, disconnected connectors, intermediate or continuous short circuits, ground short, power supply issues, missing terminating resistor, corroded wires and/or connectors, swapped high and low circuits (e.g., CAN high and low circuit swaps), disconnected wakeup circuits, shorted wakeup circuits, Vehicle Identification Number ("VIN") security issues from swapped controllers, grounding issues, programming issues (e.g., due to corrupt software, memory damage, etc.). In some embodiments, the internal communication system 118 may determine that an issue has occurred based on data, such as communication DTCs, communication error frames, bus traffic/congestion, etc., and may communicate the issue to the MTU 120.

Swapping controllers (e.g., within the industrial vehicle systems or between industrial vehicles) may result in communication system issues referred to as VIN security issues. In one embodiment, the MTU 120 may detect a VIN security issue by comparing a product identification number ("PIN") of each controller against a database of PINs associated with the industrial machine system 100. The database of PINs may be generated during manufacturing or at the time of commissioning the industrial machine.

The MTU 120 may further determine that an issue with the communication system has occurred upon determining that one or more controllers of the industrial machine system 100 have stopped sending and/or receiving messages or sent and/or received messages are determined to be incomplete messages, thereby resulting in error codes or DTCs being generated. In some examples, the DTC (such as a DTC in an SPN.FMI format of 2XXX.YY) generated may include a series of characters (e.g., XXX) indicating the source address of the "missing" controller (i.e., the controller not sending or receiving messages). This allows for the faulty controller to be identified easily by the industrial machine system 100.

The MTU 120 may further analyze data associated with specific communication protocols, such as those conforming to Unified Diagnostic Services ("UDS") protocols, such as ISO 14229, which use data identifier ("DID") and/or Routine Identifier ("RID) data. Controllers conforming to the UDS protocols may include within the DID data, information such as "who is my neighbor" and/or what communication network or subnet they exist on. For example, a controller associated with the engine system 104 may include information in the DID data that the controller is positioned next to a terminating resistor on one side and a transmission controller on the other side of it within the communication network (e.g., CAN bus 110), as well as what channel the controller communications on. This can allow the MTU 120 to more precisely localize where the issue is on the communication network.

In response to determining that no issue is detected, monitoring of the communication system health continues at process block 502. In response to determining that an issue was detected, the data associated with the issue is packaged at process block 506. Packaging the data may include packaging all data used to determine that the issue occurred, as described above, into a data format suitable for transmission by the MTU 120 over the communication interface 404, such as wirelessly over antenna 410. For example, the data may be packaged for transmission using one or more communication protocols, such as those described above. Additional data may be provided in the data package, such as general industrial machine operating data (e.g., battery voltage, engine status, etc.), communication system data (e.g., recent DTCs, bus statistics, software/firmware versions, communication bus voltages, message counts, bus loading, etc.), general machine data (e.g., location, VIN, model number, owner, associated dealer, maintenance records, etc.). The data may further include an indication or definition of the detected issue, as well as other information related to the detected issue, such as location on the communication network). This additional data may be used for analyzing the detected issue at a remote device, such as remote service server 124.

Upon the data being packaged, the data is transmitted at process block 508. In one embodiment, the data is transmitted using the communication interface 404 of the MTU 120. For example, the data may be transmitted wirelessly over the antenna 410 and received by a remote device, such as the remote service server 124.

Figure 6:
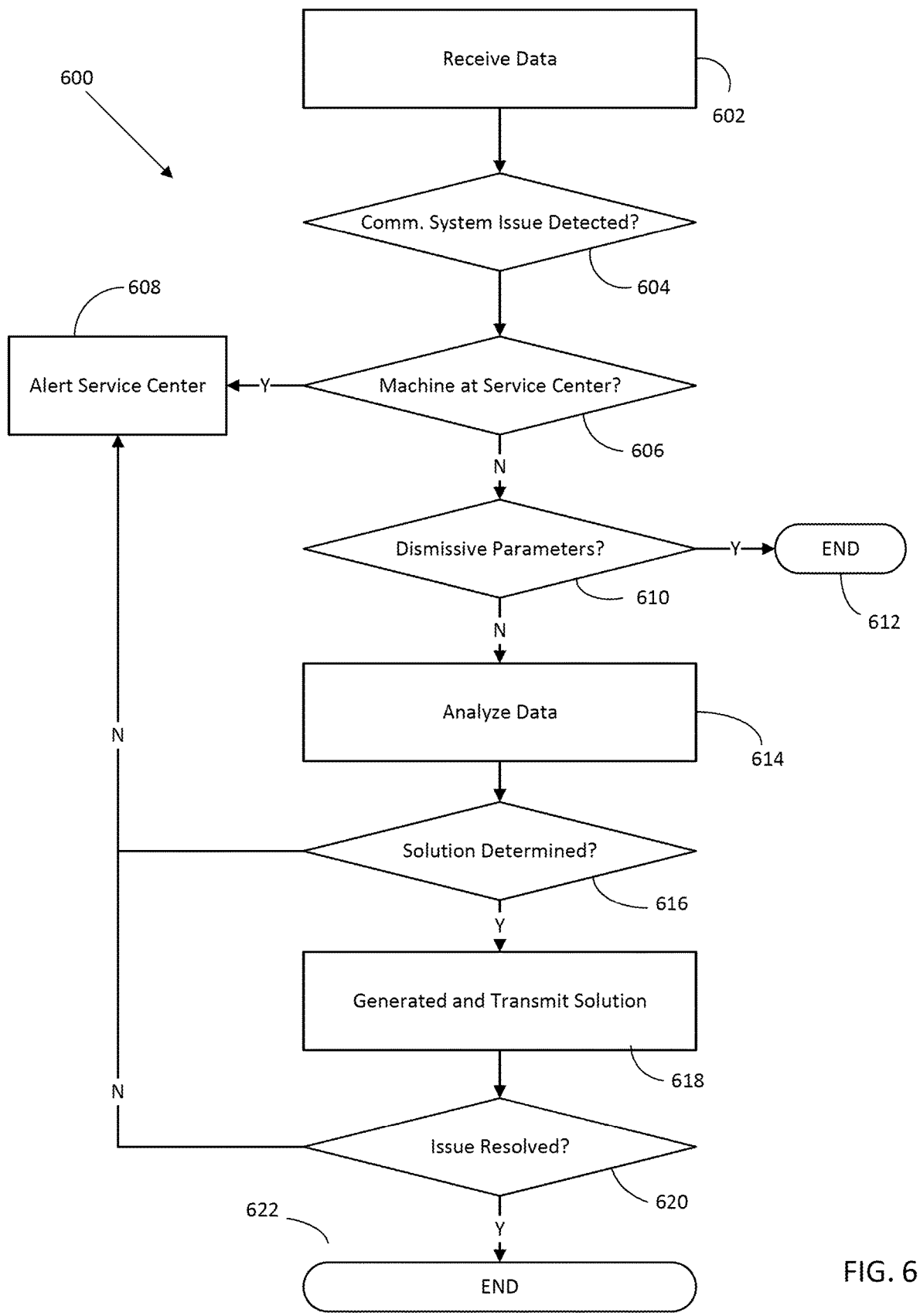
FIG. 6 is a flow chart illustrating a process for determining a solution to a detected communication system of an industrial machine, according to some embodiments.

Turning now to FIG. 6, a process 600 for determining a solution to a detected communication system issue is described, according to some embodiments. The process 600 may be performed by the remote service server 124. However, in some examples, other external devices may be configured to execute the process 600. Thus, while the process 600 is described with respect to the remote service server 124, it is contemplated that one or more other external devices may execute the process 600 as required for a given application. Data is received by the remote service server 124 at process block 602. In some examples, the data may be general industrial machine operating data (e.g., battery voltage, engine status, etc.), communication system data (e.g., recent DTCs, bus statistics, software/firmware versions, etc.), general machine data (e.g., location, Vehicle Identification Number ("VIN"), model number, owner, associated dealer, maintenance records, etc.). and/or any other data transmitted by the MTU 120.

At process block 604, the remote service system 124 determines whether a communication systems issue is detected. In some examples, the remote service system 124 determines that there is a communication system issue based on an indication of an issue in the received data. For example, the received data may include specific data related to a detected issue, such as detected issues described above with respect to the process 500. In other examples, the remote service system 124 may analyze the received data to determine whether there is a communication system issue. For example, the communication bus diagnostics module 416 may analyze the data to determine whether a communication system data issue is present based on the received data. Issues may include those described above with respect to FIG. 5. The communication bus diagnostics module may utilize various analysis methods, as described above. For example, the communication bus diagnostics module may utilize statistical analysis, historical analysis, Advanced CAN diagnostics, or any other diagnostic and/or data analysis as required for a given application. Specific examples of the analysis are further described in U.S. Pat. No. 11,233,713 entitled Controller Area Network and Connectivity Health Troubleshooting System, U.S. Pat. No. 10,657,450 entitled machine diagnostic systems and U.S. Pat. No. 9,765,690 entitled Variable Geometry Turbocharger Prognostics, which are hereby incorporated by references in their entireties herein. In response to determining that there is no communication system issue, the remote service system 124 continues to receive data at process block 602.

In response to determining that there is a communication system issue, the remote service server 124 next determines whether the industrial machine transmitting the data is at a maintenance location at process block 606. Maintenance locations may include authorized repair centers, dealerships, and/or any other location where maintenance or other service may be provided to the industrial machine. In some examples, the industrial machine is determined to be located at or near a maintenance location based on location data (e.g., positioning data) within the received data. In other examples, the remote service system 124 may send a signal or command to the industrial machine to transmit a location. In still further examples, the industrial machine may periodically transmit its location to a remote server, such as the remote service server 124. The remote service server 124 may access the most recent transmitted location to determine whether the industrial machine is at a maintenance location.

In response to determining that the industrial machine is at a maintenance location, an alert is transmitted by the remote service system 124 to the maintenance location associated with the industrial machine indicating that a communication system issue has been detected at process block 608. The remote service system 124 may additionally transmit the detected issue as well as any relevant received from the industrial machine to the maintenance location. This can allow the maintenance personnel at the maintenance location to evaluate and attempt to resolve the issue while the industrial machine is already located at the maintenance location.

In response to determining that the industrial machine is not at the maintenance location, the remote service server 124 determines whether one or more dismissive parameters and/or data are associated with the determined communication system issue. Dismissive parameters may be associated with non-fault events that can result in error data (e.g., DTCs, communication system DTC, bus errors, bus faults, etc.) being generated. For example, during reprogramming of one or more controllers or systems coupled to the communication bus (e.g., CAN bus controllers in communication with the CAN bus 110) communication system data (e.g., DTCs, faults, connection failures, etc.) may be generated indicating a communication system issue. However, these issues are generally resolved once the reprogramming is complete. In one example, during a reprogramming operation, one or more informative messages or codes may be generated that indicate the occurrence of a reprogramming event. The informative messages provide information and are generally not associated with a fault. In one example, a DM13 message may be generated when a reprogramming event occurs. The DM13 message is generally associated with an industrial vehicle utilizing an SAE J1939 vehicle communication bus. The SAE J1939 standard may be used in conjunction with a CAN bus. The above DM13 message is for example purposes, and it is understood that other informative message, codes, and/or DTCs may be generated during a reprogramming event as applicable for a given industrial vehicle communication network. In one embodiment, the DM13 message (or other reprogramming informative message) may be transmitted by the MTU 120 and received by the remote service server 124.

Additional dismissive parameters may include an industrial machine battery voltage and/or voltage alert (e.g., low voltage message, high voltage message, etc.). For example, low industrial machine battery voltage can result in communication system data that may appear indicative of a communication system issue. This data (e.g., DTCs) will generally be resolved upon the industrial machine battery voltage returning to an acceptable level. Other dismissive parameters may include DTCs, or other codes associated with a controller swap, system reset, etc. In some examples, dismissive parameters may be established and/or determined, as necessary for a given application.

In response to determining that one or more dismissive parameters exist, the process 600 ends at process block 612. In response to determining that no dismissive parameters exist, the remote service server 124 analyzes the received data at process block 614. Analyzing the data may include evaluating the determined issue in view of the received data, as well as other data, such as historical machine data, previous solutions provided with respect to the determined issue, etc. In one example, the data is analyzed to determine one or more potential solutions for a detected issue. Example solutions may include reprogramming a controller, repairing a loose or bad ground, and/or other solution as required for a given application. In one embodiment, the remote service server 124 may evaluate multiple parameters, such as combination of DTCs, types of DTCs, frequency of occurrence of DTCs, origin of DTCs (e.g., same controller, multiple controllers, etc.), software/firmware versions, and/or other data as required for a given application. The remote service server 124 may further evaluate historical data to determine intermittent issues and/or to trend data over time to assist in the analysis. By trending the data over time, the remote service server 124 may be able to better identify intermittent issues, such as grounding issues, shorting issues, etc.

The data analysis and associated solutions are described in more detail in U.S. Pat. No. 11,233,713 entitled Controller Area Network and Connectivity Health Troubleshooting System, U.S. Pat. No. 10,657,450 entitled machine diagnostic systems and U.S. Pat. No. 9,765,690 entitled Variable Geometry Turbocharger Prognostics, which are hereby incorporated by references in their entireties herein. In one embodiment, the analysis may be performed the service solutions module 414 of the remote service server 124. However, other components of the remote service server 124 may also analyze the data, including the machine diagnostic module 412, the communication bus diagnostics module 416, and/or the predictive maintenance module 418.

At process block 616, the remote service server 124 determines whether a solution to the one or more noted issues was determined. In response to no solution being determined, an alert is transmitted to a service center (e.g., maintenance location, repair center, dealership, etc.) at process block 608. The alert may include information, such as the one or more determined issues and associated data, and/or other information as required for a given application. In some examples, the alert may automatically generate a maintenance request for the industrial machine associated with the determined issues(s). The maintenance request may assign a technician to further diagnose and/or resolve the determined issues.

In response to a solution being determined, the solution is generated and transmitted at process block 618. The solution may be transmitted to a user device linked to the applicable industrial device, to a service center, an assigned technician, or to the industrial machine itself for display on a user interface. At process block 620, the remote service server 124 determines whether the issue has been resolved. In some examples, the remote service server 124 may receive an indication from the industrial machine, such as via the MTU 120, indicating that the issue has been resolved. For example, an all-clear signal may be transmitted by the MTU 120 to the remote service server 124. In other examples, the remote service server 124 may note the absence of one or more DTCs associated with the issue in received data and determine that the issue has been resolved. In other examples, an end user or technician may transmit a signal to the remote service server indicating that the issue has been resolved.

In response to determining that the issue has not been resolved, a service center is alerted at process block 608. The alert may serve to generate a maintenance request and/or dispatch a technician to further diagnose or resolve the issue. In response to determining that the issue has been resolved, the process 600 ends at process block 622. In one example, the remote service server 124 may perform actions in response to the issue not being resolved if no indication that the issue has been resolved have been received after a predetermined time after the solution was transmitted. In one embodiment, the predetermined time is one hour. However, values of more than one hour or less than one hour are also contemplated as required for a given application.

Figure 7:
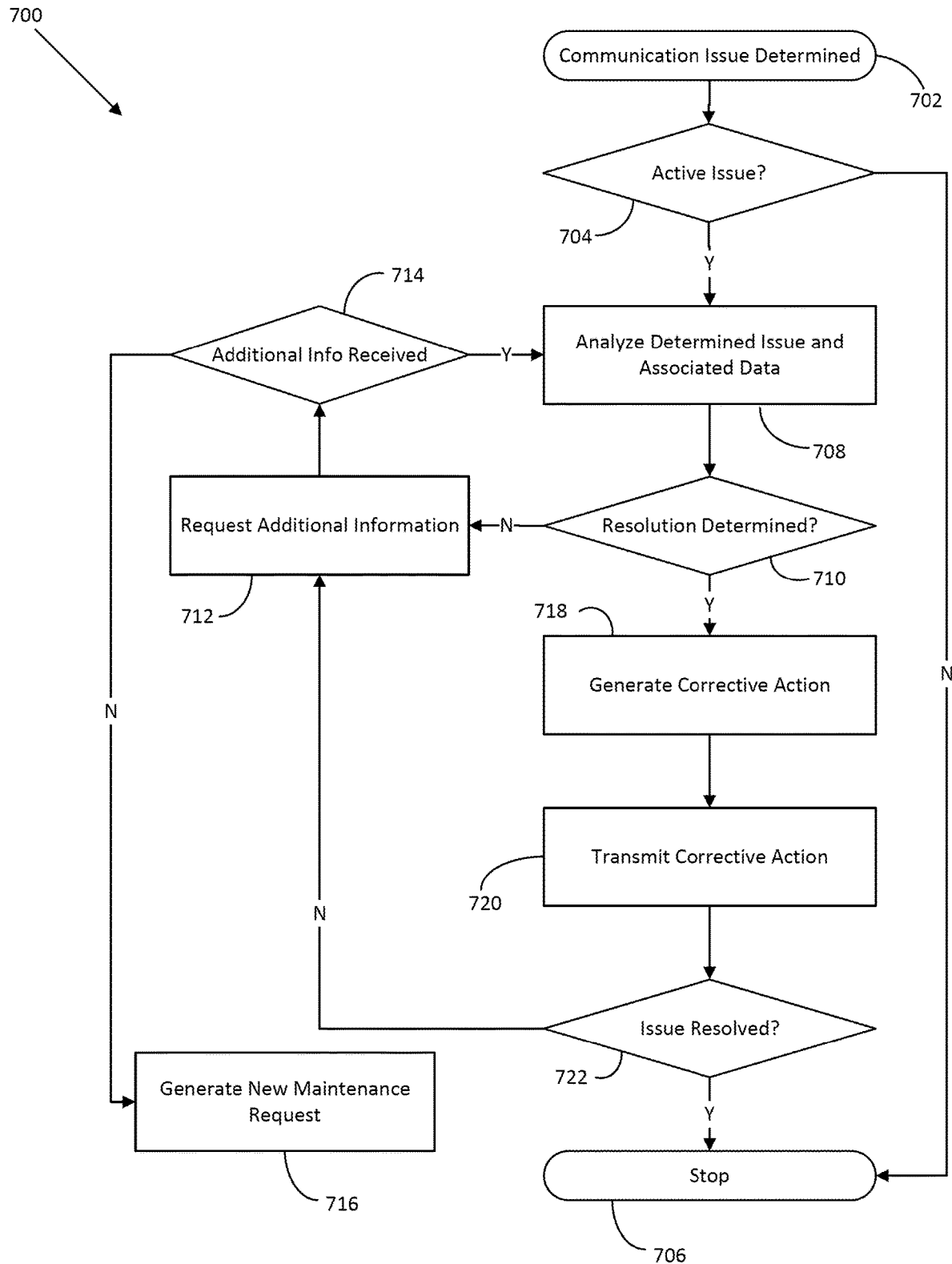
FIG. 7 is a flow chart illustrating an alternative process for determining a solution to a detection communication system of an industrial machine communication system, according to some embodiments.

Turning now to FIG. 7, an alternative process 700 for determining a solution to a detected communication system issue of an industrial machine communication system is described, according to some embodiments. The process 700 may be performed by the remote service server 124. However, in some examples, other external devices may be configured to execute the process 700. Thus, while the process 700 is described with respect to the remote service server 124, this is for exemplary purposes, and it is contemplated that one or more other external devices may execute the process 700 as required for a given application.

At process block 702, a communication system issue is determined by the remote service server. In one embodiment, the remote service server 124 may determine the communication system issue using various data (e.g., communication system data, communication DTCs, etc.) as described above. At process block 704, the remote service server 124 determines whether determined communication system issue is an active issue (e.g., whether the associated machine is in proximity to a maintenance location and/or one or more dismissive parameters are presents, as described above with respect to process blocks 606 and 610, as described above.). In response to determining that the determined communication system issue is not an active issue, the process 700 ends at process block 706.

In response to determining that the determined communication system issue is an active issue, the remote service server 124 analyzes the determined communication system issue and data associated with the determined communication system issue at process block 708. This may be similar to the analysis described with respect to process block 614, described above. In some examples, the data is general telemetry data (e.g., various communication system data as described above). In one embodiment the determined communication system issue and associated data is analyzed to determine whether there is a resolution associated with the determined communication system issue. In some examples, a combination of the detected issue and the associated data is analyzed to determine a resolution for the detected issue. A resolution may be any action, process, or instructions that may resolve the detected issue. As described herein, the analysis may utilize historical data, user data, artificial intelligence, and/or any other analysis methodology required to determine a resolution to the determined communication system issue.

At process block 710, the remote service server 124 determines whether a resolution to the determined communication system issue was determined. In response to determining that no resolution to the determined communication system issue was determined, the remote service server 124 request additional information from the industrial machine system, such as industrial machine system 100, at process block 712. The additional information may include historical data, additional communication system data, machine diagnostic data, and/or any other data required to assist the remote service server in determining the resolution. At process block 714, the remote service server 124 determines whether the requested additional information was received. In response to determining that the additional data was received, the remote service server 124 analyzes the data at process block 708, as described at above. In response to the remote service server determining that the requested additional information was not received, a new maintenance request is generated at process block 716. The maintenance request may be provided to a technician, service center, dealership, and/or other system/user required to address the determined communication system issue.

Returning now to process block 710, in response to the resolution to the determined communication system issue being determined, the remote service server 124 generates the corrective action (i.e., the determined resolution) at process block 718 and then transmits the corrective action at process block 720. The corrective action may be transmitted to a user device linked to the applicable industrial device, to a service center, an assigned technician, or to the industrial machine itself for display on a user interface. At process block 722, the remote service server 124 determines whether the determined communication system issue has been resolved. In some examples, the remote service server 124 may receive an indication from the industrial machine, such as via the MTU 120, indicating that the determined communication system issue has been resolved. For example, an all-clear signal may be transmitted by the MTU 120 to the remote service server 124. In other examples, the remote service server 124 may note the absence of one or more DTCs associated with the determined communication system issue in received data and determine that the issue has been resolved. In other examples, an end user or technician may transmit a signal to the remote service server indicating that the determined communication system issue has been resolved.

In response to determining that the issue has not been resolved, additional information is requested at process block 712. In response to determining that the issue has been resolved, the process 700 ends at process block 706. In one example, the remote service server 124 may perform actions in response to the determined communication system issue not being resolved when no indication that the issue has been resolved have been received after a predetermined time after the solution was transmitted.

Figure 8:
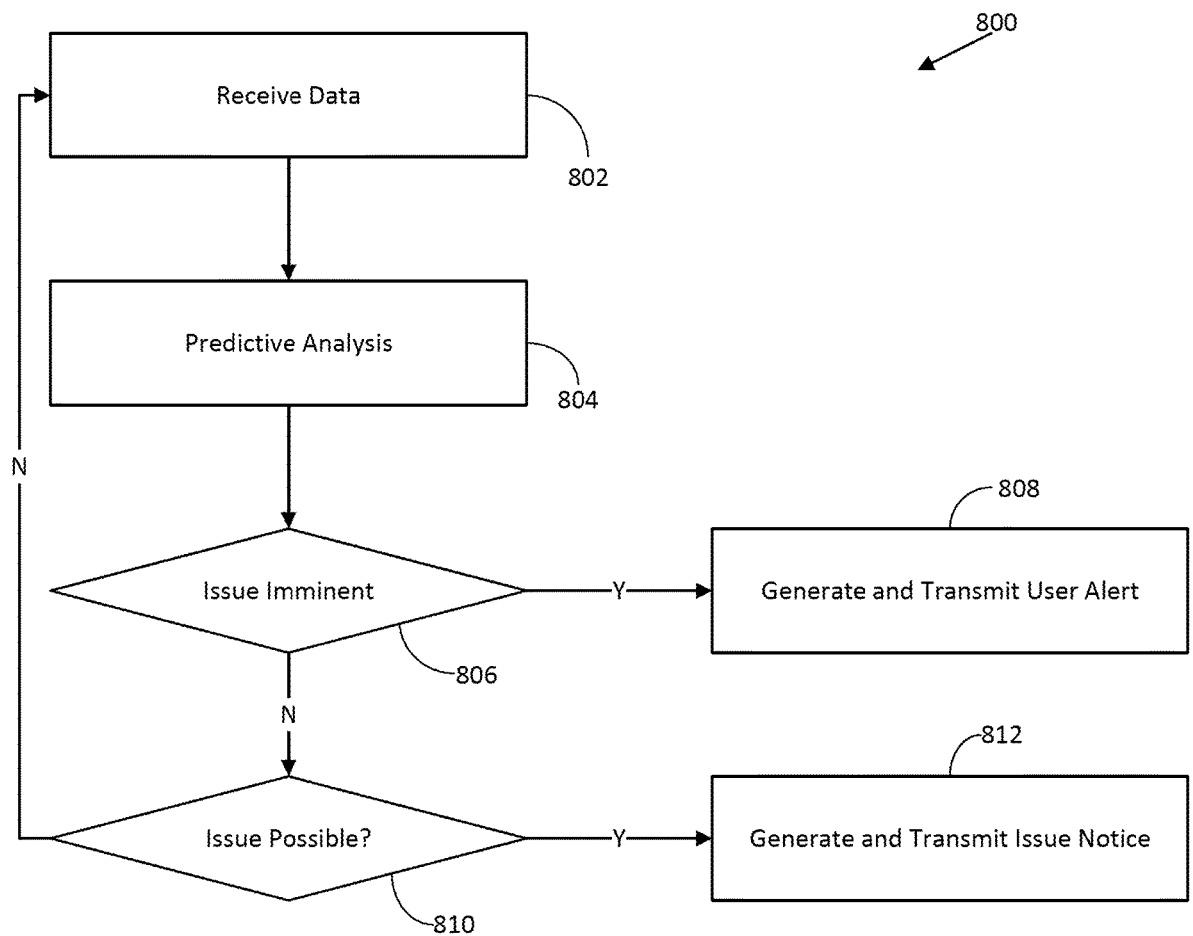
FIG. 8 is a flow chart illustrating a process for communication system issue prognostication, according to some embodiments.

Turning now to FIG. 8, a process 800 for communication system issue prognostication is described, according to some embodiments. The process 800 may be performed by the remote service server 124, such as via the predictive maintenance module 418. The process 800, in some embodiments, is configured to predict potential failures or other issues associated with a communication system of an industrial machine system, such as industrial machine system 100. By predicting potential failures or issues, preventative maintenance may be performed on the associated industrial device to prevent and/or reduce the likelihood of a failure occurring, thereby reducing downtime of the industrial machine.

At process block 802, the remote service server receives data from an industrial machine system, such as via an MTU 120. The received data may be associated with a communication system of the industrial machine. In one example, the received data may include general industrial machine operating data (e.g., battery voltage, engine status, etc.), communication system data (e.g., recent DTCs, bus statistics, software/firmware versions, etc.), general machine data (e.g., location, Vehicle Identification Number ("VIN"), model number, owner, associated dealer, maintenance records, etc.).

Upon receiving the data, one or more predictive analysis operations are performed on the data. As noted above the predictive maintenance module 418 may utilize various predictive analysis operations, such as real-time data, historical data, and/or a combination thereof to predict further behaviors of the industrial machine. In some examples, the predictive maintenance module 418 may utilize various processes or programs to predict behaviors, such as Machine Learning processing. Machine Learning processes may utilize one or more of decision tree learning, associates rule learning, artificial neural networks, recurrent artificial neural networks, long short term memory neural networks, inductive logic programming, support vector machines, clustering, Bayesian networks, reinforcement learning, representation learning, similarity and metric learning, sparse dictionary learning, genetic algorithms, k-nearest neighbor (KNN), and/or other processes as required for a given application.

At process block 806, the remote service server determines whether an issue or failure is imminent. Imminent failures or issues may be those which have an exceedingly high likelihood of occurring (e.g., >90%) within a predetermined time frame (e.g., within a day, within a week, within a month, etc.). However, likelihood values of more than 90% or less than 90% are also contemplated as required for a given application.

In response to determining that a failure or issue associated with the communication system of an industrial vehicle is imminent, the remote service server 124 generates and transmits a user alert at process block 808. The user alert may include information indicating that the user/operator of the industrial machine should either perform a repair, or contact a technician, service center, and/or dealership to schedule maintenance. In some examples, the user alert is also transmitted directly to a technician associated with the industrial machine, a dealership associated with the industrial machine, and/or a service center associated with the industrial machine.

In response to determining that no issue is imminent, the remote service server 124 determines whether an issue is possible at process block 810. For example, a failure or issue may be possible where the likelihood is greater than a possibility value (e.g., 50%), but less than an imminent possibility value (e.g., 90%). However, possibility values of more than 50% or less than 50% are also contemplated as required for a given application. The remote service server 124 may also evaluate when the failure or issue may occur, such as within a day, within a week, within a month, within a year, etc.). However, other time frames are also contemplated as required for a given application.

In response to determining that a failure or issue is possible, the remote service server generates and transmits an issue notice to a user of the industrial machine at process block 812. The issue notice may include information indicating that the user/operator of the industrial machine should either perform a repair, or contact a technician, service center, and/or dealership to schedule maintenance. In some examples, the issue notice may also be transmitted directly to a technician associated with the industrial machine, a dealership associated with the industrial machine, and/or a service center associated with the industrial machine such that during a previously or future schedule service, the possible failure and/or issue can be addressed. In response to determine that no issues or failures are possible, the remote service server 124 continues to receive data at process block 802.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the term "user" is inclusive of owners, operators, technicians, dealers, service providers, and other individuals associated with the operation, sales, and maintenance of a machine, the term is therefore intended to facilitate the description of the exemplary embodiments of the present disclosure, and is not intended to limit the structure or operation of the exemplary embodiments of the present disclosure to any particular person. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A method of diagnosing a communication system within an industrial machine comprising:
   receiving, from the industrial machine, communication system data of the communication system of the industrial machine;
   determining whether the received communication system data indicates an occurrence of a communication system issue;
   determining whether the received communication system data includes one or more dismissive parameters in response to determining that the received communication system data indicates the occurrence of the communication system issue;
   analyzing the received communication system data to determine whether a remote resolution to the communication system issue is available in response to determining that the received communication system data does not include the one or more dismissive parameters; and
   transmitting the remote resolution to a user associated with the industrial machine in response to determining that the remote resolution to the communication system issue is available.

2. The method of claim 1, wherein dismissive parameters include at least one selected from a list consisting of a reprogramming code, a low battery voltage code, and a controller swap code.

3. The method of claim 2, wherein the reprogramming code is a DM13 message.

4. The method of claim 1, further comprising generating a service center alert in response to determining that the remote resolution to the communication system is not available, wherein the service center alert generates a new maintenance request for the industrial machine.

5. The method of claim 1, further comprising:
   receiving a position of the industrial machine;
   determining whether the position of the industrial machine is within a predetermined distance of a service center based on the received position; and
   generating a service center alert in response to determining that the industrial machine is within the predetermined distance.

6. The method of claim 1, wherein the communication system is a J1939 communication system.

7. The method of claim 1, further comprising:
   determining whether a signal indicating that the determined communication system issue is resolved; and
   generating a service center alert in response to determining that the determined communication system issue is not resolved within a predetermined time period.

8. The method of claim 1, further comprising:
   determining whether a signal indicating that the determined communication system issue is resolved; and
   generating a service center alert in response to determining that the determined communication system issue is not resolved within a predetermined time frame.

9. A system for diagnosing a communication system within an industrial machine, comprising:
   a service system in communication with a telematics unit of an industrial machine via a communication protocol, wherein the service system includes an electronic processor configured to:
   receive, from the industrial machine, communication system data associated within the communication system;
   determine whether the received communication system data indicates an occurrence of a communication system issue;
   determine whether the received communication system data includes one or more dismissive parameters in response to determining that the received communication system data indicates the occurrence of the communication system issue;
   analyze the received communication system data to determine whether a remote resolution to the communication system issue is available in response to determining that the received communication system data does not include the one or more dismissive parameters; and
   transmit the remote resolution to a user associated with the industrial machine in response to determining that the remote resolution to the communication system issue is available.

10. The system of claim 9, wherein dismissive parameters include at least one selected from a list consisting of a reprogramming code, a low battery voltage code, and a controller swap code.

11. The system of claim 10, wherein the reprogramming code is a DM13 message.

12. The system of claim 9, wherein the electronic processor is further configured to generate a service center alert in response to determining that the remote resolution to the communication system is not available, wherein the service center alert generates a new maintenance request for the industrial machine.

13. The system of claim 9, wherein the electronic processor is further configured to:
  receive a position of the industrial machine;
  determine whether the position of the industrial machine is within a predetermined distance of a service center based on the received position; and
  generate a service center alert in response to determining that the industrial machine is within the predetermined distance.

14. The system of claim 9, wherein the communication system is a J1939 communication system.

15. The system of claim 9, wherein the electronic processor is further configured to:
  determine whether a signal indicating that the determined communication system issue is resolved; and
  generate a service center alert in response to determining that the determined communication system issue is not resolved within a predetermined time period.

16. A method of diagnosing a communication system within an industrial machine comprising:
  receiving, from the industrial machine, communication system data of the communication system of the industrial machine;
  determining whether the received communication system data indicates an occurrence of a communication system issue;
  determining whether the received communication system data includes one or more dismissive parameters in response to determining that the received communication system data indicates the occurrence of the communication system issue;
  analyzing the received communication system data to determine whether a remote resolution to the communication system issue is available in response to determining that the received communication system data does not include the one or more dismissive parameters;
  transmitting a request to the industrial machine to provide additional information in response to determining that the remote resolution is not available; and
  transmitting the remote resolution to a user associated with the industrial machine in response to determining that the remote resolution to the communication system issue is available.

17. The method of claim 16, further comprising generating a service center alert in response to no additional information being received in response to the transmitted request for additional information.

18. The method of claim 16, wherein dismissive parameters include at least one selected from a list consisting of a reprogramming code, a low battery voltage code, and a controller swap code.

19. The method of claim 18, wherein the reprogramming code is a DM13 message.

20. The method of claim 16, wherein the communication system is a J1939 communication system.

* * * * *